Patented Apr. 18, 1944

2,346,768

UNITED STATES PATENT OFFICE 2,346,768

CATALYTIC ISOMERIZATION

Kenneth C. Laughlin, Baton Rouge, La., assignor to Standard Oil Development Company, a corporation of Delaware No Drawing. Application September 14, 1939, Serial No. 294,871

11 Claims. (Cl. 260—683.5)

The present invention relates to the isomerization of hydrocarbons and more particularly to the conversion of normal or straight chain paraffinic hydrocarbons into iso- or branched chain paraffinic hydrocarbons by catalytic means.

It is known to isomerize or convert normal paraffinic hydrocarbons into branched chain paraffinic hydrocarbons by means of catalysts of the Friedel-Crafts type such as aluminum chloride and aluminum bromide, and the like. However, in such reactions, the catalyst is not always maintained at a high degree of activity during the reaction. Likewise, these reactions as carried out by the prior art employ solid catalysts under the conditions of reaction or, as in the case of aluminum chloride where the isomerization reaction is carried out at higher temperatures, that is, at temperatures above the sublimation point of aluminum chloride, the catalyst is in vapor form. In either case, that is, solid or vapor state, the catalyst may be more difficult to handle and manipulate than in cases where liquid catalysts may be employed. There are a number of advantages, especially in commercial operation, to the use of catalysts which are liquid under the conditions of the reaction.

It is an object of the present invention to provide a process for the catalytic isomerization of hydrocarbons, particularly the paraffinic hydrocarbons, and to carry out such a process while maintaining the catalyst mass in a molten or liquid condition under the conditions of operation. It is a further object of the invention to provide a continuous catalytic isomerization process wherein the actual catalytic agent is in a readily manipulative condition, that is, a condition conducive to its greater ease of handling. Another object is to isomerize individual straight chain paraffinic hydrocarbons, such as normal butane, normal pentane, normal hexane, normal heptane, and the like, into their corresponding branched chain isomeric forms or to isomerize straight run paraffinic naphthas of relatively low octane number into corresponding branched chain paraffinic naphthas of higher octane number and having other improved fuel qualities while at the same time avoiding substantial cracking. It is still a further object of the invention, by reason of the molten or liquefied condition of the catalyst or catalyst mixture, to facilitate the addition and withdrawal of catalyst, particularly in a continuous type operation. Other objects will be apparent from a full understanding of the invention to be hereinafter more fully described.

In order to accomplish the objects of this invention, the conversion of straight chain hydrocarbons, particularly of the paraffin series, is effected in the presence of liquefied or molten aluminum halides, for example, molten aluminum chloride and molten aluminum bromide, either singly or in admixture. The reaction may also be carried out in the presence of promoters such as the hydrogen halides, for example, hydrogen chloride, hydrogen bromide, the alkyl halides, such as methyl chloride or bromide, ethyl chloride or bromide, butyl and amyl halides, boron fluoride, and the like. It is likewise efficacious to use mixtures of promoters in some instances. Thus, for example, where a mixture of molten aluminum bromide and molten aluminum chloride is used as the catalyst, a mixture of hydrogen chloride and hydrogen bromide may be introduced, a mixture of hydrogen chloride and alkyl bromide or hydrogen bromide and an alkyl chloride may be employed. The catalyst, when used in a molten condition, is highly advantageous in that the loss thru the volatility of the catalyst is reduced to a minimum, thereby resulting in lower catalyst consumption. Likewise, from a commercial standpoint, the use of liquid catalysts is many times desired in preference to the use of solid or gas phase catalysts. Molten aluminum bromide, for example, may be readily introduced into the system by means of liquid phase pumps and may be almost entirely withdrawn from the system thru the usual types of apparatus designed for liquid phase operation. The pumpability of molten catalysts is a decided advantage in many instances, particularly where a phase separation of two liquids occurs within the system. These advantages are readily apparent to those working in the isomerization field.

The present process is designed to isomerize various paraffinic hydrocarbons either as single compounds of relatively high purity or as mixtures of straight chain paraffin hydrocarbons. For example, suitable feed stocks may comprise one or more of the following: normal butane, normal pentane, normal hexane, normal heptane, and the higher homologues, the corresponding branched chain isomers resulting from subjecting this type of feed to the process being isobutane, isopentane, isohexane, isoheptane, and the like. The feed stock may also comprise mixtures of more than one of these straight chain paraffins or, if convenient, the paraffinic hydrocarbon mixture may contain small proportions of branched chain paraffins, although for greatest efficiency the hydrocarbon feed stock should comprise essentially straight chain paraffins. Mixed paraffins, such as straight run naphthas and field butanes, may also be converted into isomeric mixtures which have an increased value with respect to branchiness. Considering the nature of the catalyst employed, it is desirable to minimize the presence of aromatic and olefins in the feed stock since their reactivity is considerably higher than the corresponding paraffins and it is known that the Friedel-Crafts type catalysts readily alkylate and/or polymerize the olefins and aromatics in such feed stocks under the conditions of reaction. However, in general, any hydrocarbon mixture composed predominantly of saturated straight chain compounds is suitable as a feed stock for the process herein described.

A product of the isomerization reaction containing substantial amounts of branched chain isomers may be separated from the reaction medium and fractionated within the desired boiling range. The constituents boiling above and below the desired range may then be returned to the isomerization reactor to suppress their further formation or to be further isomerized to more useful products. Likewise, hydrogen may be added to the reaction system in an effort to minimize the rate of degradation of the isomerization catalysts employed. In general, it may be said that the more intimate the contact between the reactants and the catalyst the greater the rate at which the isomerization reaction occurs. It is therefore desirable to employ some means of intimately contacting the reactants with the catalyst mass, such as homogenizers, jets of restricted internal diameter, turbo mixers, mixing pumps, centrifuges, mechanical stirrers and agitators, mechanical shakers, and the like. The invention, however, is not restricted to any particular method of obtaining intimate contact of the reactants with the catalyst.

The isomerization may be effected over a fairly wide range of conditions of temperature, time of contact, catalyst concentration, etc., all of these factors being interrelated. In general, temperatures ranging from the melting point of the catalyst up to 400 or even as high as 450° F. may be employed although in general, temperatures only sufficiently high to insure that the catalyst is maintained in the molten condition are preferred. Thus, for example, in the case of aluminum chloride where the system is maintained under a superatmospheric pressure of at least 2½ atmospheres, the reactor temperature is maintained at at least about 375° F. In the case of aluminum bromide being employed as the isomerization catalyst, a temperature of at least about 200° F. should be employed although in the case of aluminum bromide the reaction may be carried out at either atmospheric pressure or, if desired, under any suitable superatmospheric pressure. However, it has been found that temperatures above about 425° F. are not particularly advantageous for the production of high yields of isomer, particularly with respect to the longer chained paraffinic hydrocarbons. However, the reaction may be carried out at temperatures as high as 450° F., care being taken that the reactants are not maintained at that temperature in contact with the catalyst for longer than between about one and about ten minutes since cracking of the reactants is distinctly detrimental to the ultimate production of the higher branched chain paraffins, that is, those paraffins having 7 and 8 or even higher carbon atoms per molecule. For specific paraffins, specific temperature ranges may be ascertained at which optimum yields of the desired isomers are produced. It is not intended that the invention should be limited to any particular temperature range when processing a particular hydrocarbon mixture, nor that the time of contact of the reactants with the catalyst should be maintained within the limits above specified where the particular feed stock has been found to be better suited to times of contact longer or shorter than those above specified.

As heretofore stated, various promoters may be employed for carrying out the process of the present invention. However, it has been found that their use is not absolutely essential to the ultimate success of the process. In general, it is preferred to employ a promoter for obtaining the desired results with a minimum time factor involved. However, as will be seen from the examples hereinafter described, the use of hydrogen chloride in an isomerization with aluminum bromide as the catalyst did not materially increase the yield of the desired isomeric product. It did, however, tend to reduce the amount of cracking and consequent production of undesired hydrocarbons in the ultimate product. In the case of aluminum chloride, only fair results are attained in the absence of a promoter. However, yields equally as good or better than those obtained with aluminum bromide are possible where promoters, for example, hydrogen chloride or ethyl chloride, are used in conjunction with the aluminum chloride.

The reaction is preferably carried out under liquid phase conditions. However, it will be noted that where normal butane and/or normal pentane is the feed stock, it is relatively difficult, in the case of the latter, and impossible in the case of the former, to employ molten aluminum chloride as the catalyst to maintain the feed in the isomerization reactor in a liquid condition since the temperature required for maintaining the aluminum chloride in a molten condition is above the critical temperature of normal butane and only slightly below the critical temperature of normal pentane. However, with respect to the higher paraffinic homologues and the straight run naphthas, there is no difficulty experienced in maintaining an entirely liquid phase operation. It should be likewise noted that aluminum bromide possesses advantages over aluminum chloride when it is desired to operate a liquid phase process with respect to the isomerization of normal butane and normal pentane, since pressures may be employed sufficient to liquefy these compounds under the conditions of reaction obtaining when employing molten aluminum bromide as the catalyst. In general, for commercial operation, it is desired that sufficient superatmospheric pressure be employed to maintain their reactants and reaction products in the liquid phase under the conditions of reaction obtaining. In this way, a separation of the catalyst from the hydrocarbon products and feed is facilitated. No cumbersome and intricate filtering mechanism is required for removing the spent catalyst or partially spent catalyst from the reaction product. In particular, liquid phase operations are also conducive to ultimate high yields and to the carrying out of the process in commercial operation involving continuous procedure. It is to be understood, however, that the process is not only applicable for continuous and liquid phase operation, but it is contemplated to carry the same out in batch type apparatus and in vapor phase either with respect to a single batch type operation or with respect to a continuous operation.

In the present case, the catalyst may be employed in a molten condition in a preponderating amount in the reactor. The feed stock may be injected in a finely dispersed state such as thru a jet of restricted internal diameter into the molten bath of catalyst while withdrawing the product from the catalyst and re-injecting the same therethru, or the catalyst and reactants may be mixed together, intensively agitated, withdrawn in toto from the reactor and separated in a separate settler. The catalyst so separated may then be either discharged from the system in cases where it is practically completely spent or it may be returned to the isomerization reactor for further use in the process.

The catalyst, for best results, should be in a highly active state as, for example, freshly prepared aluminum bromide or aluminum chloride or freshly sublimed aluminum chloride. Any suitable method of catalyst preparation may be used. In general, the higher the purity of the catalyst the more efficient catalytic activity is exhibited by the catalyst in the isomerization reaction. Spent catalyst withdrawn from the system may be reactivated or reformed in any suitable method, for example, by distillation, sublimation, or solvent extraction.

The isomerization reactor may be a bomb, autoclave, or some such suitable reactor, or the isomerization reaction may be carried out in a series of bombs or autoclaves connected in series in which the greater part of the isomerization reaction is conducted in one reactor under fairly drastic conditions and the effluent therefrom is introduced into a second or, if desired, further reactors conducted under milder conditions of operation to obtain a product of the desired branchiness. The catalyst in a molten condition may be introduced into the feed or directly into the reactor. It is preferred to preheat the feed stock to the temperature of the reaction although this is not necessary where the reactor is provided with some external heating means.

No special type of apparatus is required for carrying out the process of the present invention. Any apparatus which is suitable for alkylation, polymerization, and the like, in which liquid catalysts have been used for these reactions, may be employed. Any sludge formed during the reaction with the catalyst may be separated from the final products by a settling chamber, by centrifuge, or by filter, although it is to be distinctly understood that any suitable process of separating sludge from the reaction products may be employed. The apparatus is constructed of the usual materials employed in refinery practice. In general, it is preferred to use corrosion resistant liners for those parts of the apparatus coming in contact with the catalyst or catalyst sludge. Glass lined containers or containers lined with or made of stainless steel, ceramic substances, and/or similar materials employed in connection with corrosive processes, may be employed in the process herein described. However, the invention is not limited to any particular type of apparatus nor to any particular type of material employed in its construction.

In order to more fully understand the process of the present invention, the following examples are given:

Example 1

About 4.5 grams of freshly prepared aluminum bromide was filled in a glass tube with about 50 cc. of substantially anhydrous normal butane and the same was heated for about 12 hours at about 212° F. with agitation. At the end of this period, the hydrocarbon product was analyzed and was found to contain about 62.5% of isobutane, about 4.2% of $C_3$ hydrocarbons, about 1% of $C_5$ and heavier hydrocarbons, and about 32.3% of unreacted normal butane.

Example 2

A similar experiment was conducted involving the introduction of about 2% of hydrogen chloride, the other conditions of reaction and reactants, catalyst, etc., remaining the same. The product was analyzed and found to contain about 63% of isobutane, about 3.8% of $C_3$ hydrocarbons and about 33.2% of unchanged normal butane. There was no measurable amount of heavier hydrocarbons formed in this reaction.

It will thus be seen that a promoter, such as hydrogen chloride, when added to molten aluminum bromide, although not materially increasing the yield of isobutane formed, did, in fact, produce less $C_3$ and $C_5$ and heavier hydrocarbons than was the case where the isomerization was carried out in the absence of a promoter. It will also be seen that molten aluminum bromide has a distinct advantage in isomerization reactions when employed in connection with a promoter since the production of by-products, such as products formed during cracking, is maintained at a minimum.

Having thus fully described the invention, what is claimed as new and useful and desired to be secured by Letters Patent is:

1. An improved process for isomerizing normal paraffin hydrocarbons containing at least four carbon atoms per molecule comprising subjecting said normal paraffin to the action of a bath of an aluminum halide taken from the group consisting of aluminum bromide and aluminum chloride maintained in the liquid phase while maintaining the reaction mixture under isomerization reaction conditions.

2. A process as in claim 1 in which promotional amounts of at least one hydrogen halide are added to the isomerization reaction mixture.

3. An improved process for isomerizing normal paraffin hydrocarbons containing at least four carbon atoms per molecule comprising subjecting said normal paraffin to the action of a bath of aluminum bromide maintained in the liquid phase while maintaining the reaction mixture under isomerization reaction conditions.

4. An improved process for isomerizing normal paraffin hydrocarbons containing at least four carbon atoms per molecule comprising subjecting said normal paraffin to the action of a bath of aluminum chloride maintained in the liquid phase while maintaining the reaction mixture under isomerization reaction conditions.

5. A process which comprises passing at least one straight chain paraffin containing at least four carbon atoms per molecule through a bath of an aluminum halide taken from the group consisting of aluminum bromide and aluminum chloride maintained in the liquid state under isomerization reaction conditions and recovering isoparaffin from the reacted mixture.

6. A process as in claim 5 in which a hydrogen halide is employed in promotional amounts.

7. A process which comprises passing normal butane containing a promotional amount of ethyl chloride through a bath of aluminum chloride maintained in the liquid phase under isomerization reaction conditions and recovering isobutane from the reacted mixture.

8. A process as in claim 7 wherein the temperature is maintained at about 212° F. and under sufficient superatmospheric pressure to maintain the aluminum halide in the liquid phase.

9. In a process of isomerizing normal paraffin of at least four carbon atoms per molecule in the presence of an aluminum halide taken from the group consisting of aluminum bromide and aluminum chloride and a hydrogen halide promoter under isomerization reaction conditions, the improvement comprising introducing the aluminum halide in the liquid phase into the reactor and passing the normal paraffin through a bath of said aluminum halide maintained in the liquid phase under isomerization reaction conditions.

10. In a process of isomerizing normal butane in the presence of aluminum chloride and hydrogen chloride under isomerization reaction conditions, the improvement comprising introducing the aluminum chloride in the liquid phase into the reaction zone and carrying out the isomerization reaction by passing the normal butane through a bath of the aluminum chloride maintained in the liquid phase.

11. In a process of isomerizing normal butane in the presence of aluminum bromide and hydrogen chloride under isomerization reaction conditions, the improvement comprising introducing the aluminum bromide in the liquid phase into the reaction zone and carrying out the isomerization reaction by passing the normal butane through a bath of the aluminum bromide maintained in the liquid phase.

KENNETH C. LAUGHLIN.